Figure 15:
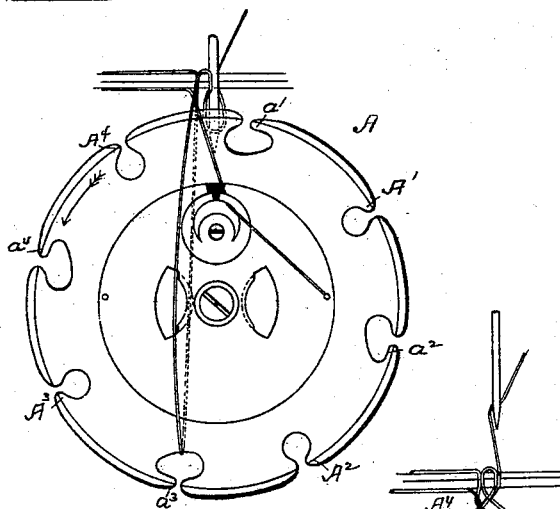

No. 613,536. Patented Nov. 1, 1898.
H. R. TRACY.
SEWING MACHINE.
(Application filed Apr. 10, 1896. Renewed Mar. 31, 1898.)
(No Model.) 6 Sheets—Sheet 1.
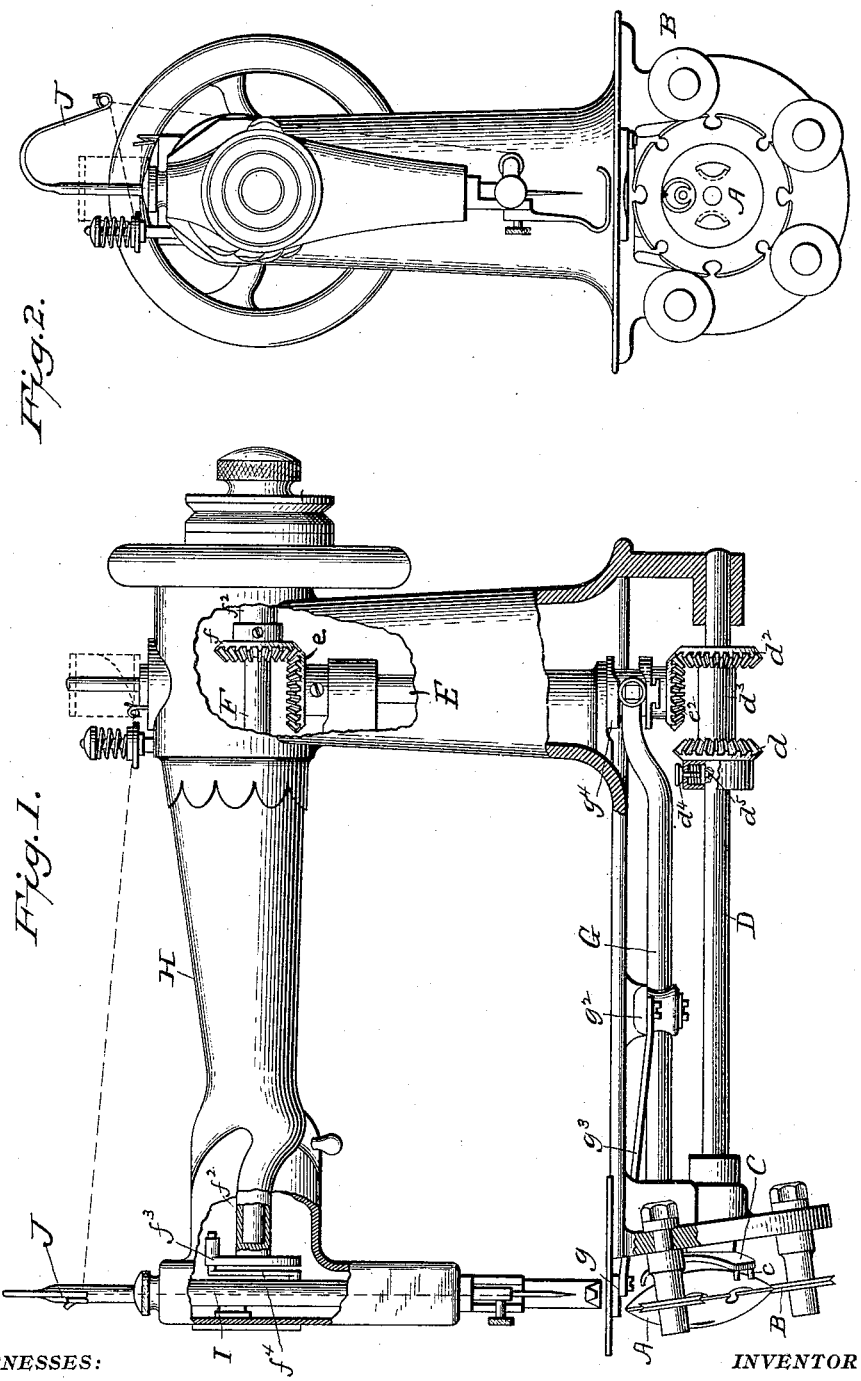
WITNESSES:
INVENTOR:
Harriet Ruth Tracy
her attorney

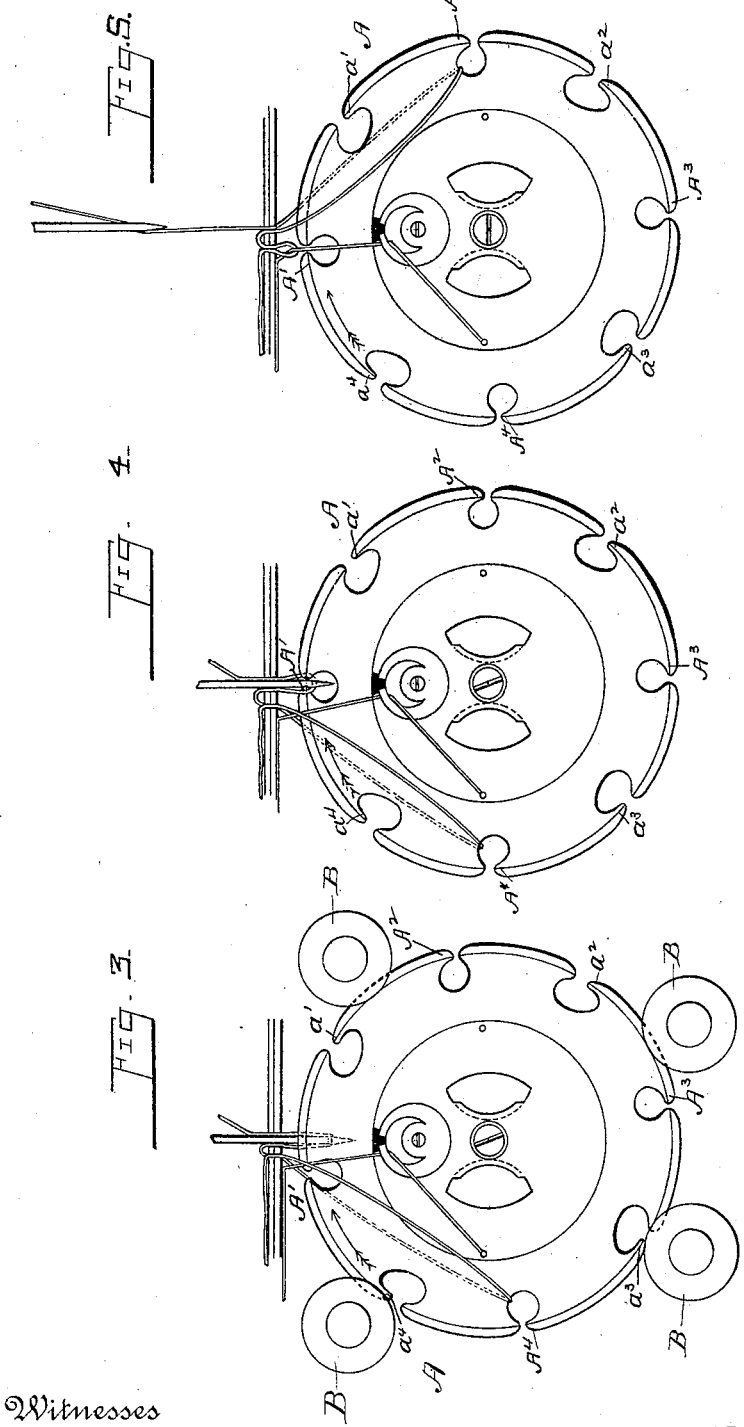

No. 613,536. Patented Nov. 1, 1898.
H. R. TRACY.
SEWING MACHINE.
(Application filed Apr. 10, 1896. Renewed Mar. 31, 1898.)
(No Model.) 6 Sheets—Sheet 3.
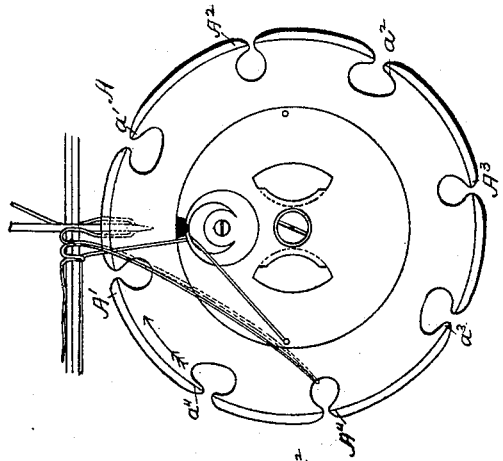
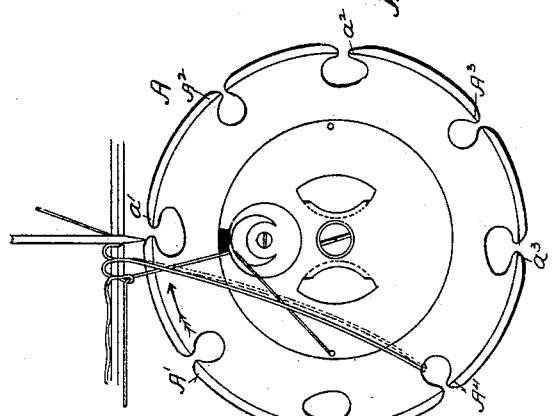
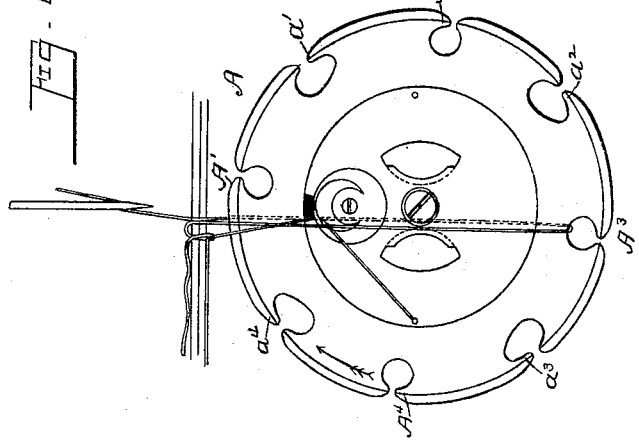
Witnesses:
F. S. Pelt.
E. L. Parry
Inventor:
Harriet Ruth Tracy
by R. S. Dyrenforth,
her attorney.

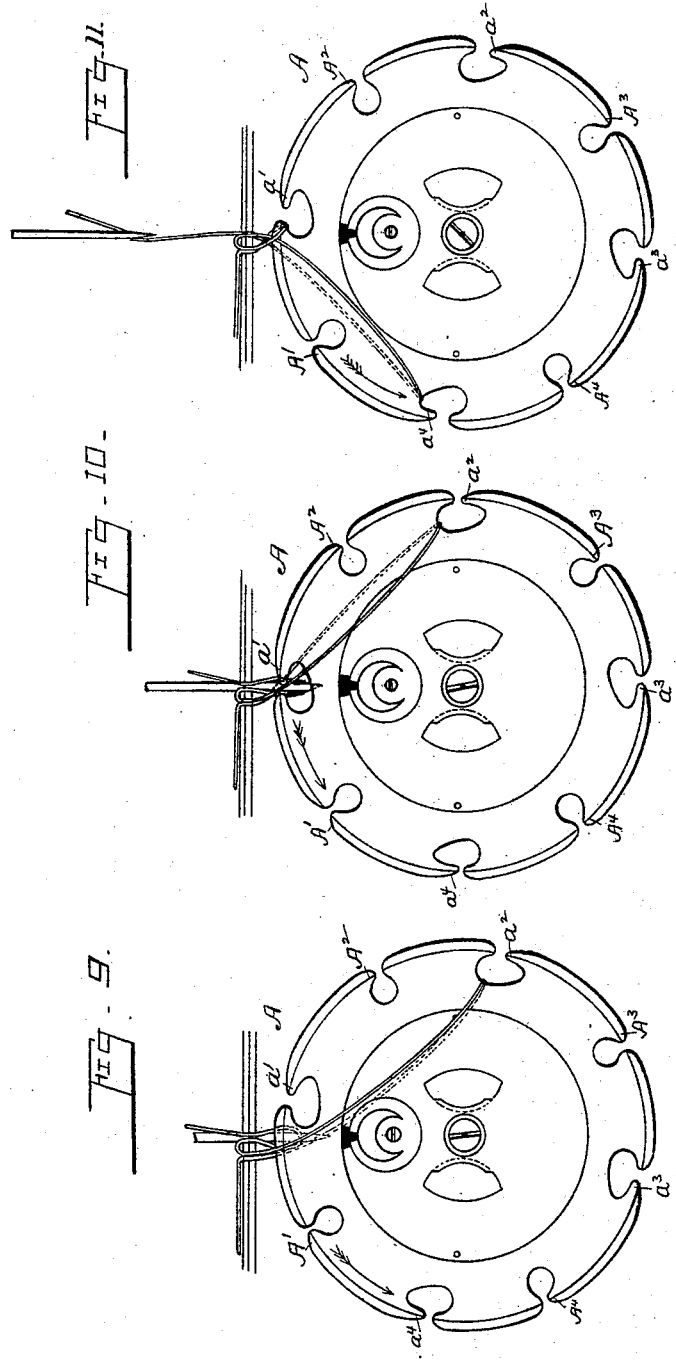

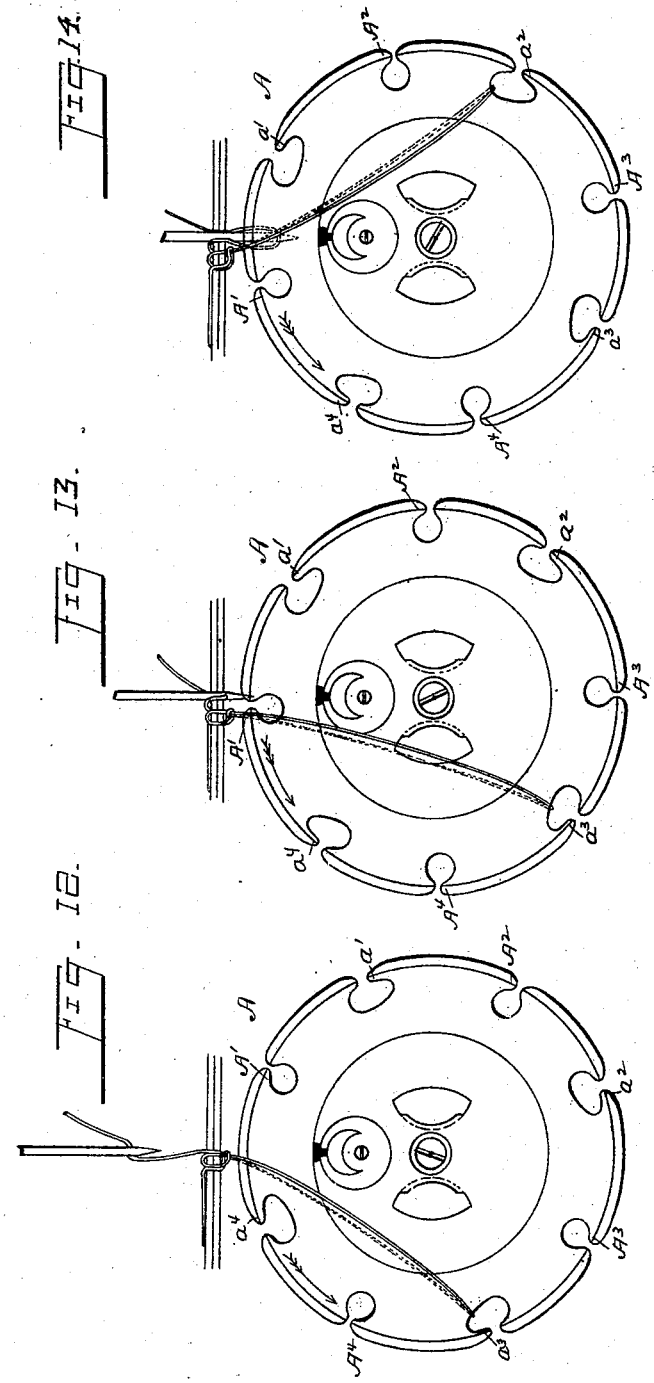

No. 613,536. Patented Nov. 1, 1898.
H. R. TRACY.
SEWING MACHINE.
(Application filed Apr. 10, 1896. Renewed Mar. 31, 1898.)
(No Model.) 6 Sheets—Sheet 6.

Witnesses:
H. S. Belt.
E. H. Parry.

Inventor:
Harriet Ruth Tracy,
by R. S. Dyrenforth,
her attorney.

THE NORRIS PETERS CO., PHOTO-LITHO., WASHINGTON, D. C.

UNITED STATES PATENT OFFICE.

HARRIET RUTH TRACY, OF NEW YORK, N. Y.

SEWING-MACHINE.

SPECIFICATION forming part of Letters Patent No. 613,536, dated November 1, 1898.

Application filed April 10, 1896. Renewed March 31, 1898. Serial No. 676,007. (No model.)

*To all whom it may concern:*

Be it known that I, HARRIET RUTH TRACY, a citizen of the United States, residing at New York, (New Brighton,) in the county of Richmond and State of New York, have invented certain new and useful Improvements in Sewing-Machines; and I do hereby declare the following to be a full, clear, and exact description of the invention, such as will enable others skilled in the art to which it appertains to make and use the same.

This invention relates to sewing-machines, and particularly to that class in which a revoluble shuttle or loop-taker is employed and in which the loop of the needle-thread is engaged by the loop-taker and is carried entirely around the same to inclose a second or lower thread to form a lock-stitch, or in which one loop of a needle-thread is engaged by the loop-taker and is carried through a preceding loop to form a chain-stitch or a lock chain-stitch.

In an application filed by me in the United States Patent Office January 18, 1895, Serial No. 535,330, for an improvement in sewing-machines I have illustrated and described a revoluble loop-taker provided with six hook-openings, two series of three hooks each, one series when rotated in one direction being adapted to form one kind of a stitch, as a lock-stitch, and the hooks of the other set to engage the loop when the loop-taker is rotated in the opposite direction to form another kind of a stitch, as a chain-stitch or a lock chain-stitch. In practical operation I find that a shuttle having sets of hooks adapted to sew different kinds of stitches, as described in the said application, will operate satisfactorily when thin or medium thick fabric is sewed; but where heavy thick cloth or other fabric is sewed I find that the loops of the needle-thread will not be drawn up tightly against the under side of the fabric, owing to the fact that the needle enters the fabric before the loop of the preceding stitch is properly taken up and binds or locks the thread in the needle-opening, resulting in the formation of a succession of loose stitches or loops depending from the under side of the fabric. If to overcome this defect the tension is increased, the result will be either that the thread will break or that more thread will be drawn from the spool, the latter tending to increase the size of these loose loops. The cause of this defect in the proper taking up of the loop of the needle-thread is due to the fact that the needle reciprocates too rapidly with relation to the rotation of the shuttle, or, in other words, the shuttle does not rotate a sufficient distance between the formation of the stitches to allow adequate time for taking up of the successive stitches. It will be seen by reference to the pending application that the shuttle makes but two-thirds of a revolution to complete a stitch when either set of hooks is employed, so that the loop of the needle-thread does not have time to pass the vertical diameter of the shuttle before the needle again begins to descend to make a succeeding stitch, thereby leaving the loop on the shuttle in a relaxed condition when this succeeding stitch is begun, resulting in the formation of the loose stitches or loops on the under side of the cloth before referred to. It will be obvious, if the needle is so timed with reference to the shuttle that the latter will have rotated sufficiently to take up the slack of the loop of the needle-thread before the needle enters the fabric to make a succeeding stitch, and to draw sufficient thread from the upper spool to make a stitch in any thickness of cloth, that the formation of the loose loops will be entirely overcome, whether the fabric is thick or thin.

To this end, therefore, my invention has for its object to effect the proper and complete taking up of the loop of the needle-thread before a succeeding stitch is formed.

With this object in view the invention consists in the various novel details of construction hereinafter described and claimed.

Figure 16:
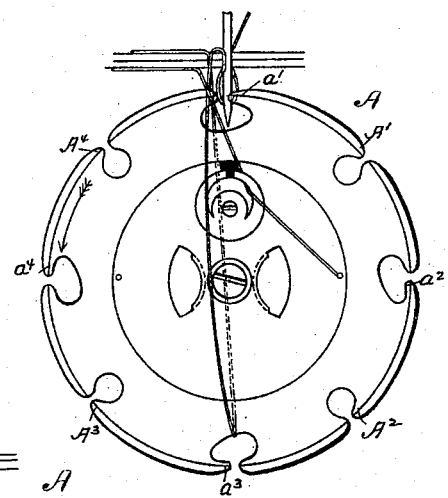
Figure 17:
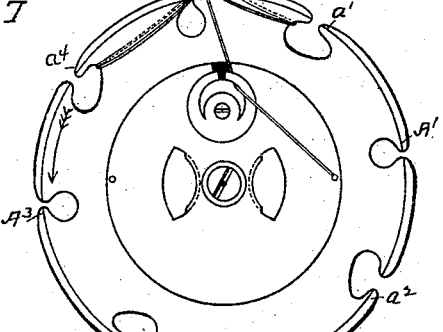
Figure 18:
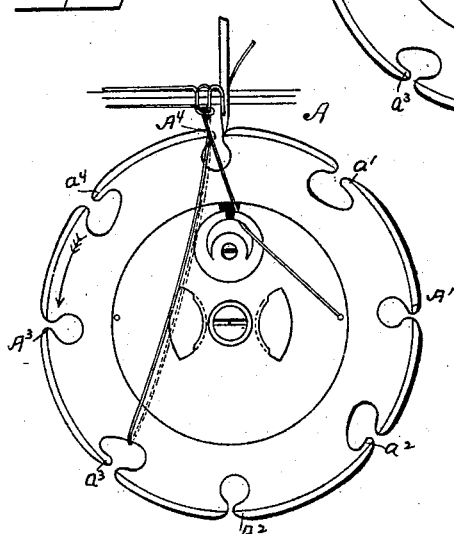
Figure 19:
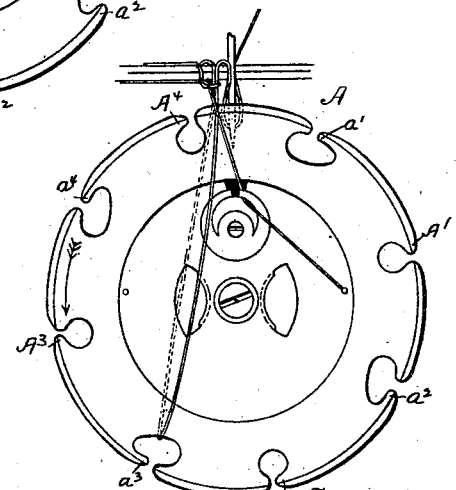

In the accompanying drawings, forming part of this specification, and in which like letters of reference indicate corresponding parts, Figure 1 is a view in front elevation showing a sewing-machine embodying my improvements, portions being broken away more clearly to display certain parts. Fig. 2 is a view in end elevation taken from the left of Fig. 1. Figs. 3, 4, 5, 6, 7, and 8 are detached views of the loop-taker and needle in operative relation to a piece of fabric being stitched, showing, respectively, in order of time, successive positions of the aforesaid parts during the operation of forming a lock-stitch, the direction of rotation of the loop-taker being denoted by the arrows of the respective figures. Figs. 9, 10, 11, 12, 13, and 14 are similar views illustrating the successive operations of the parts in forming a chain-stitch. Figs. 15, 16, 17, 18, and 19 are similar views illustrating the successive operations of the parts in forming a lock chain-stitch.

Referring to the drawings, A designates the loop-taker, which is supported adjacent to an ordinary eye-pointed reciprocating needle and receives rotary motion through suitable mechanism, hereinafter to be described. The loop-taker is displayed in this instance as supported by rollers B, although it is to be understood that it may be supported by other means than that shown. In the periphery of the loop-taker are two sets or two series of peripheral loop-engaging hooks $A'$, $A^2$, $A^3$, and $A^4$ and $a'$, $a^2$, $a^3$, and $a^4$, respectively, the hooks of one set being oppositely disposed relatively to and alternating with the hooks of the other set and each hook of each set being separated from the next adjacent hook of the same set by a pair of track-segments, which are in turn separated by the formative recess of a hook of the opposing sets of hooks.

In Figs. 3, 4, 5, 6, 7, and 8 I have shown the loop-taker and needle in operative relation to a piece of fabric being stitched, showing, respectively, in order of time, the successive positions of the aforesaid parts during the operation of forming a lock-stitch, in which the hooks $A'$, $A^2$, $A^3$, and $A^4$ come into play, the direction of rotation of the loop-taker being denoted by the arrow on the respective figures.

In Figs. 9, 10, 11, 12, 13, and 14 I have shown the loop-taker and needle in operative relation to a piece of fabric being stitched, showing, respectively, in order of time, the successive positions of the aforesaid parts during the operation of forming a chain-stitch, in which the hooks $a'$, $a^2$, $a^3$, and $a^4$ come into play, the direction of rotation of the loop-taker being denoted by the arrow on the respective figures.

In Figs. 15, 16, 17, 18, and 19 I have shown the loop-taker and needle in operative relation to a piece of fabric being stitched, showing, respectively, in order of time, the successive positions of the aforesaid parts during the operation of forming a lock chain-stitch, in which the hooks $a'$, $a^2$, $a^3$, and $a^4$ come into play, the direction of rotation of the loop-taker being denoted by the arrow on the respective figures, the only difference between the chain-stitch and the lock chain-stitch being that in the latter a shuttle-thread is employed.

In order that the successive loops of the needle-thread may be properly taken up, the needle is so timed with reference to the loop-taker that the latter performs three-quarters of a revolution between two successive descents of the needle, so that it allows ample time for the taking up of each loop before a succeeding loop is formed, thereby preventing the formation of the loops or loose stitches on the under side of the fabric.

The mechanism for operating the loop-taker comprises the loop-taker driver C, having arms $c$ for engaging sockets in the back plate of the loop-taker, as described in the application referred to. This driver is operated by a shaft D, which is driven by a vertical shaft E from the needle-bar-actuating shaft F through miter-gears $e$ and $f$, carried by the needle-bar-actuating shaft F and vertical shaft E, respectively. The lower end of this vertical shaft carries a miter-gear $e^2$, adapted to engage with either one of two miter-gears $d$ $d^2$, carried by the shaft D. These gears $d$ $d^2$ have a common hub $d^3$, the same being adapted to have a shifting movement upon the shaft D, so as to bring either one of the gears $d$ $d^2$ into engagement with the gear $e^2$ for the purpose of changing the direction of rotation of the shuttle and thereby the character of the stitch. These gears are held in adjusted position and in fixed rotative relation with the shaft D by means of any suitable locking mechanism, such as a spring-pressed detent or pin $d^4$, seated in a socket formed, in this instance, on the hub of the gear $d$, the inner end of this pin being held normally in engagement with one of a pair of lock-notches $d^5$ (only one being shown) in the shaft D, all as clearly described in the application to which reference has already been made.

The train of gears herein shown is so timed as to give the needle two complete reciprocations to a single rotation of the loop-taker, or, in other words, the train has a timing that will establish a ratio of movement between the needle and the loop-taker as two to one.

The fabric-feeding mechanism is operated directly from the shaft E and may be of any suitable construction and organization, and is here shown as consisting of a feed-dog $g$, supported in any suitable manner for reciprocation between the needle-bar and the loop-taker, a feed-dog carrier or feed-lever G, pivotally carried for vertical and horizontal oscillations by a bracket or feed-lever carrier $g^2$, a link $g^3$, connecting the feed-lever carrier and feed-dog and adapted for insuring a right-line movement to said feed-dog during operation, and the feed-lever-actuating cam $g^4$ in adjustable rotatable connection with the shaft E of the train of gears and in operative connection with the feed-lever and adapted, through the medium of the shaft E and its connections, for imparting alternate vertical and horizontal oscillations to the feed-lever.

The needle-actuating bar F is journaled at or near its opposite ends in suitable bearings $f^2$ in the arm H of the machine and is operatively connected with the needle-bar I by means of a crank $f^3$ and a connecting-link or connecting-rod $f^4$, after the usual manner of making crank connections between reciprocating parts.

The take-up J may be of any preferred construction and operates partially to draw up the loop of the needle-thread, the loose loop left in the formation of each stitch being taken up and set by the loop-taker in the formation of a succeeding stitch.

Having thus described my invention, what I claim, and desire to secure by Letters Patent, is—

The herein-described sewing-machine, comprising a reciprocatory, eye-pointed needle and a reversibly-revoluble loop-taker, having two sets of loop-engaging hooks in its periphery, each set containing four hooks and the hooks of one set alternating with, and being opposed to, the hooks of the other set, and means for actuating said needle and looper to give to the former two complete reciprocations to a single rotation of the latter, and giving to each hook a three-quarter revolution between two successive descents of the needle, substantially as described.

In testimony whereof I affix my signature in presence of two witnesses.

HARRIET RUTH TRACY.

Witnesses:
  E. H. PARRY,
  R. M. ELLIOTT.